United States Patent [19]

Furusawa et al.

[11] Patent Number: 4,786,894

[45] Date of Patent: Nov. 22, 1988

[54] CURSOR CONTROL IN A MESSAGE EDITOR

[75] Inventors: Mitsuji Furusawa; Osamu Ueno; Kenji Yamada, all of Tokyo, Japan

[73] Assignee: Oki Electric Industry Co., Ltd., Tokyo, Japan

[21] Appl. No.: 105,490

[22] Filed: Oct. 1, 1987

Related U.S. Application Data

[63] Continuation of Ser. No. 680,543, Dec. 11, 1984, abandoned.

[30] Foreign Application Priority Data

Dec. 13, 1983 [JP] Japan ................................. 58-233631

[51] Int. Cl.$^4$ ............................................. G09G 1/16
[52] U.S. Cl. ...................................... 340/709; 340/748; 400/63; 400/83
[58] Field of Search ............... 340/706, 709, 710, 723, 340/748, 750; 400/63, 83

[56] References Cited

U.S. PATENT DOCUMENTS 4,434,419  2/1984  Couper et al. .................. 400/83
4,504,825  3/1985  Bergermann et al. .............. 400/83
4,686,649  8/1987  Rush et al. ..................... 340/731

OTHER PUBLICATIONS

"Wordstar TM Reference Manual", Micropro International Corp., Release 3.3, 1983, pp. 3–8.

Primary Examiner—Gerald L. Brigance
Attorney, Agent, or Firm—Ratner & Prestia

[57] ABSTRACT

A cursor control on a screen in a message editor which produces a message by using a keyboard and a programmed computer, said cursor control has a cursor memory which stores address of the present cursor location, and X-addresses of last data locations of the present cursor line and immediate upper and the immediate down lines, and a cursor processor for controlling said cursor and said cursor memory are provided. Said cursor processor operates so that when a cursor is instructed to move to another line by depression of up key and/or down key in said keyboard, and the destination location is a null area which has no data on the screen, the cursor is automatically located to the last data location on a destination line by referring to said cursor memory.

6 Claims, 8 Drawing Sheets

FORMAT

CURSOR CONTROL IN A MESSAGE EDITOR

This application is a continuation of application Ser. No. 680,543 filed Dec. 11, 1984, now abandoned.

BACKGROUND OF THE INVENTION

The present invention relates to a location control system of a cursor indicator on a screen indicator of an information processing system which includes a computer, a telex terminal, and a word processor. A cursor is used to edit a message and/or a program on a screen.

FIG. 1 shows a conventional cursor control, in which the numeral 1 is a data input with a keyboard, 2 is a message generator, 3 is a message memory for storing a message, 4 is a screen indicator, 4a is a cursor on said screen, 5 is a cursor control for moving said cursor 4a, 5-1 is an up/down control of a cursor, 5-2 is a right/left control of a cursor, and 6 is a message editor for editing a message.

A message is generated by the message generator 2 according to the input by the data input 1, and the message the generated is stored in the message memory 3, and also is indicated on the screen 4.

The input of a message is carried out by using a keyboard on the data input 1. That keyboard has a plurality of keys (alphanumeric keys, and a return key et al).

The message thus generated is indicated on the screen 4 as shown in FIG. 3(a), and said message is stored in the memory 3 as shown in FIG. 3(b). In FIG. 3(a), each line starts at the extreme end on the screen, and the location of the return (carriage return) depends upon each line (B,D,F). On each line of FIG. (a), the right area after the return (B,D,F) symbol is a null area which has no data. So, a screen has a data area and a null area. The memory 3 has no null area in order to save memory cells.

The cursor control 5 moves a cursor on a screen, to edit a message on a screen.

The edition of a message includes correction, deletion, and addition of a character positioned in a data area on a screen, and the destination of a cursor is usually in the data area, but not in null area. The edition in a null area makes no sense, since no message exists in the null area. Therefore, it should be noted that if a cursor moves into a null area, it is transient and is on the way to the data area.

In a conventional manner for locating a cursor, an "up" key and a "down" key in the up/down control 5-1 moves a cursor in a vertical direction on a screen unconditionally, and also a "left" key and a "right" key in the right/left control 5-2 moves unconditionally a cursor in a horizontal direction.

In the example of FIG. 3(a), it is assumed that the cursor locates initially at the position D, and is moved to the position B. In that case, two kinds of operations are possible, as follows.

In a first operation, the cursor at D is first moved to B' just under the position B by using the right/left control 5-2, and then, the cursor is lifted by one line to the position B by using the up/down control 5-1.

In a second operation, the cursor at D is first lifted by one line to B" by using the up/down control 5-1, and then, the cursor is shifted to the position B by depressing the left key of the right/left control 5-2.

Accordingly, it should be noted that both the up/down control 5-1 and the right/left control 5-2 must be operated to move the cursor from D to B. Therefore, the operation of a keyboard is not simple.

SUMMARY OF THE INVENTION

It is an object, therefore, of the present invention to overcome the disadvantages and limitations of a conventional cursor control by providing a new and improved cursor control.

It is also an object of the present invention to locate a cursor on a screen with a single depression of a cursor key on the keyboard to a last data location when a destination location in the upper line or the lower line is null.

The above and other objects are attained by a cursor control in a message editor which comprises at least a keyboard, a screen, a message memory for storing a message, and a programmed processor for generation and edition of said message according to input from said keyboard, wherein a cursor memory which stores the location of present cursor location, and X-addresses of the last data locations of the present cursor line, and the immediate upper line and the immediate down line is provided, and wherein a cursor processor for controlling the cursor on the screen and said cursor memory is provided so that when a cursor is instructed to move to another line by depression of up key and down key in said keyboard, and the destination location is null which has no data on the screen, the cursor is automatically positioned at the last data location on a destination line by referring to said cursor memory.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is a block diagram of a prior cursor location system,

FIG. 2 is a block diagram of the cursor location system according to the present invention, FIGS. 3(a) and 3(b) show an example of a message format and a memory allocation in a message memory, FIG. 4 shows examples of the shift of a cursor, FIGS. 6A, 6(A)-1, 6(A)-2 and 6B are block diagrams of the cursor processor according to the present invention.

DESCRIPTION OF THE PREFERRED EMBODIMENT

Figure 1:
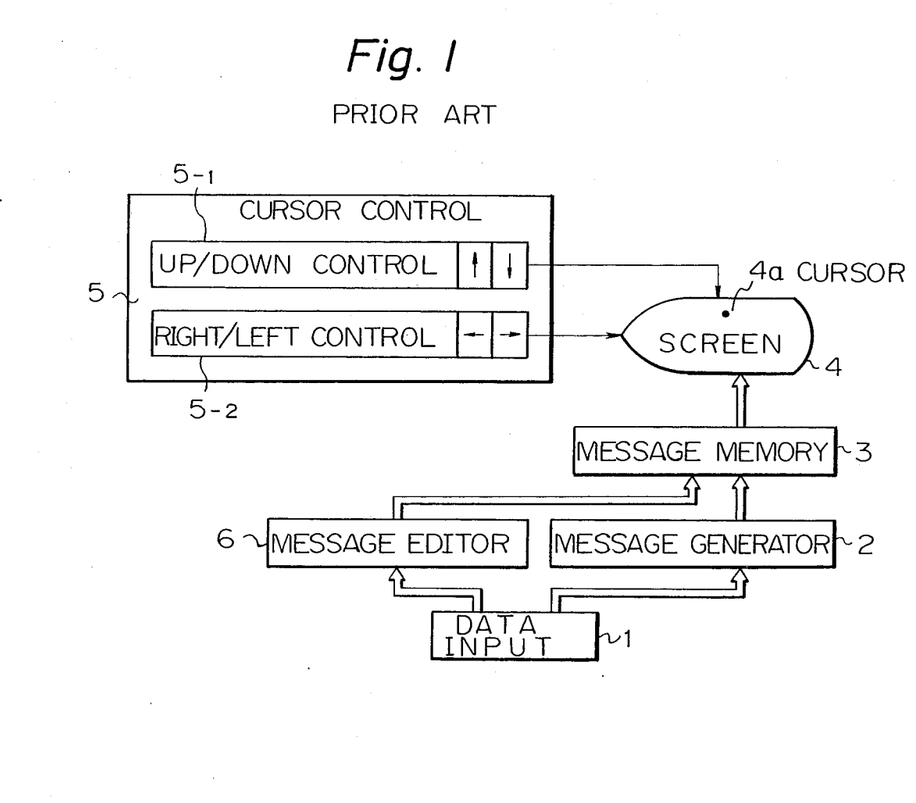
Figure 2:
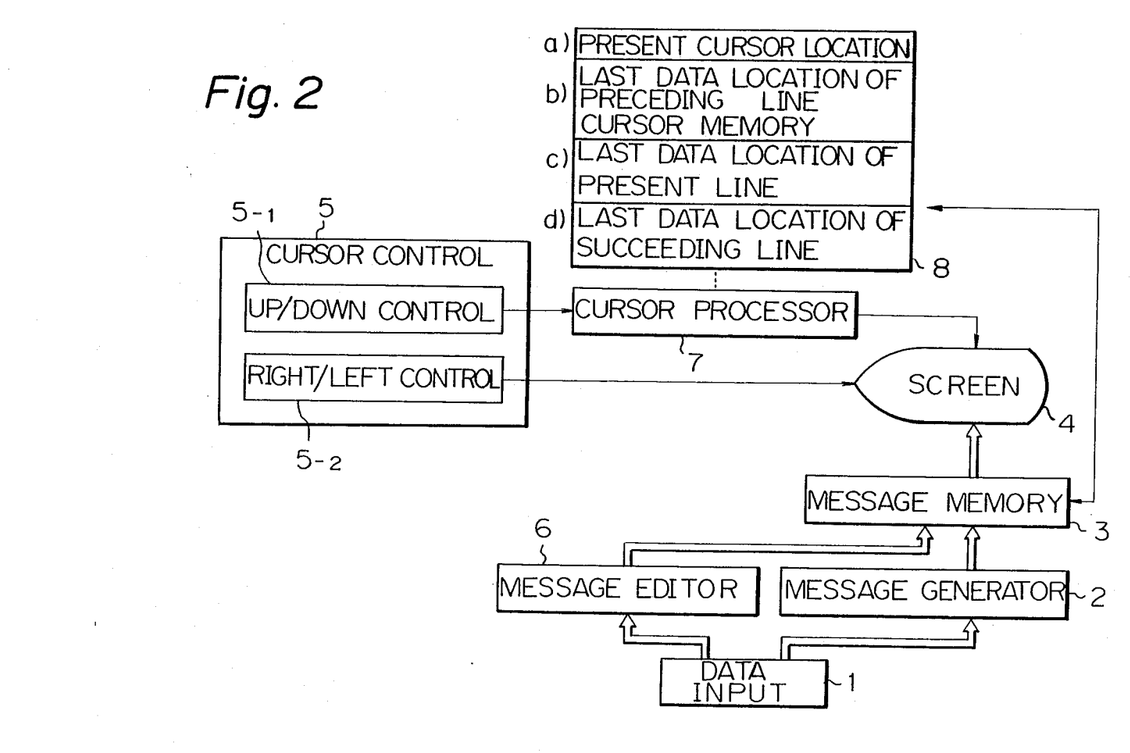
Figure 5:
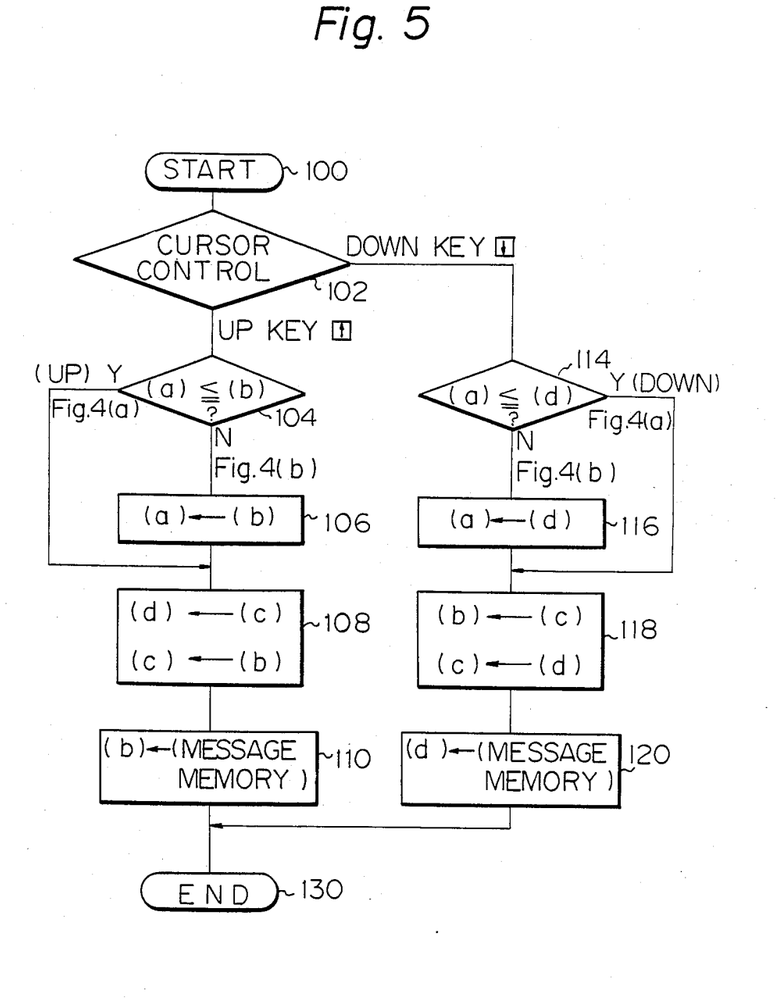
FIG. 5 is a flow diagram showing the operation of the cursor processor.
Figure 6A:
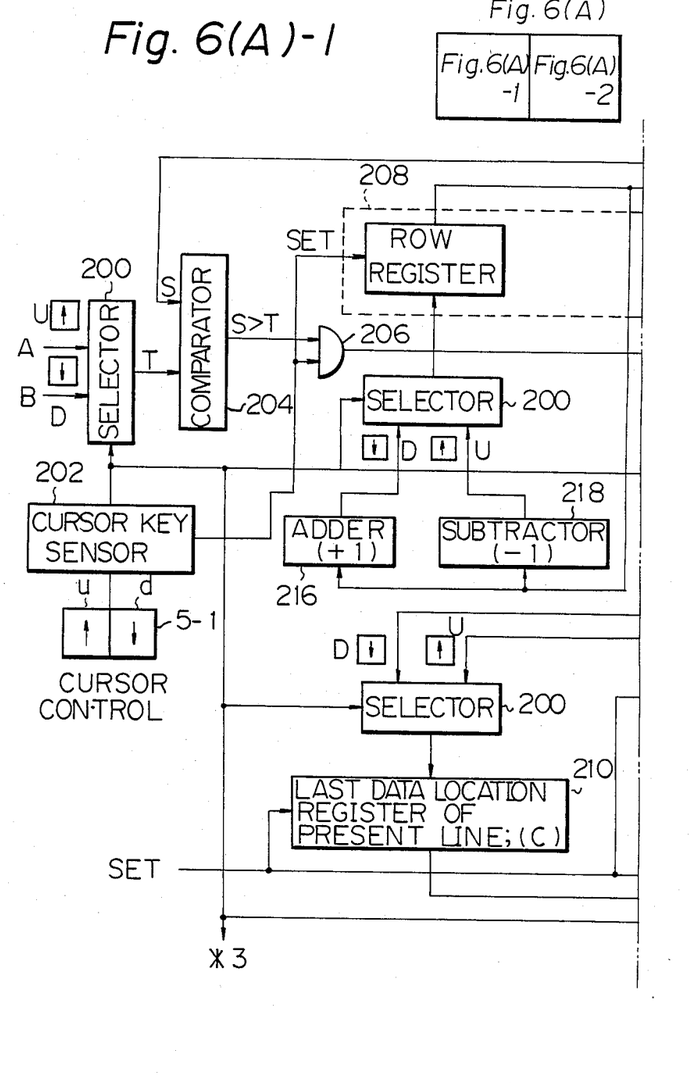
Figure 6A:
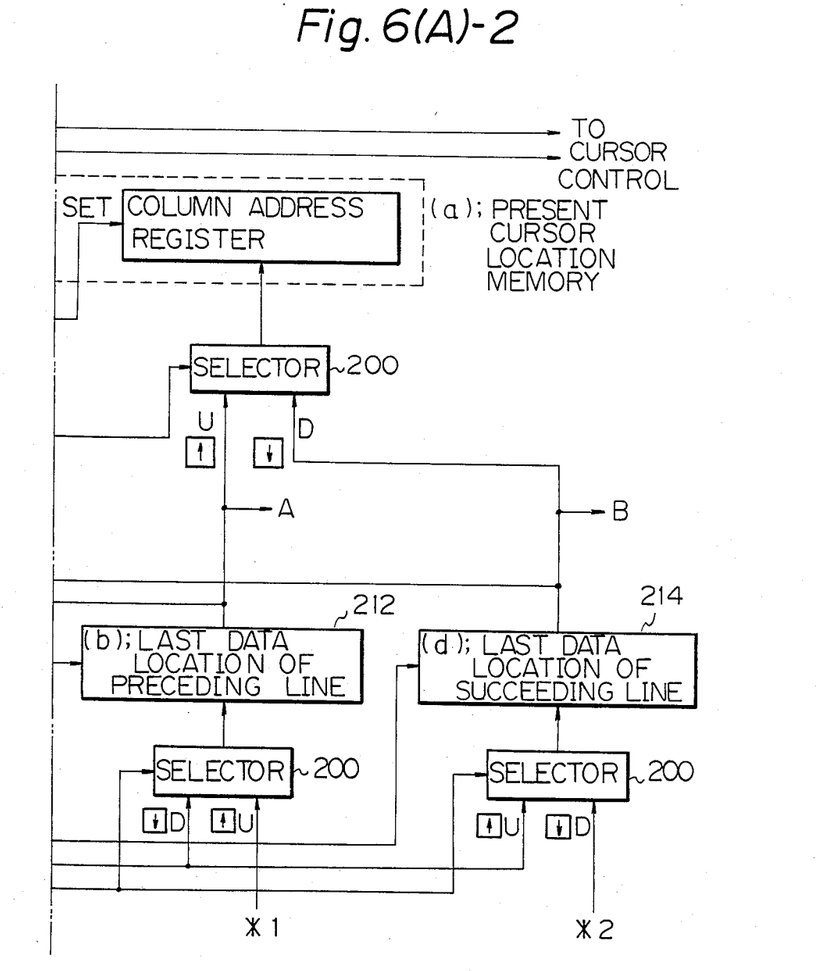
Figure 6B:
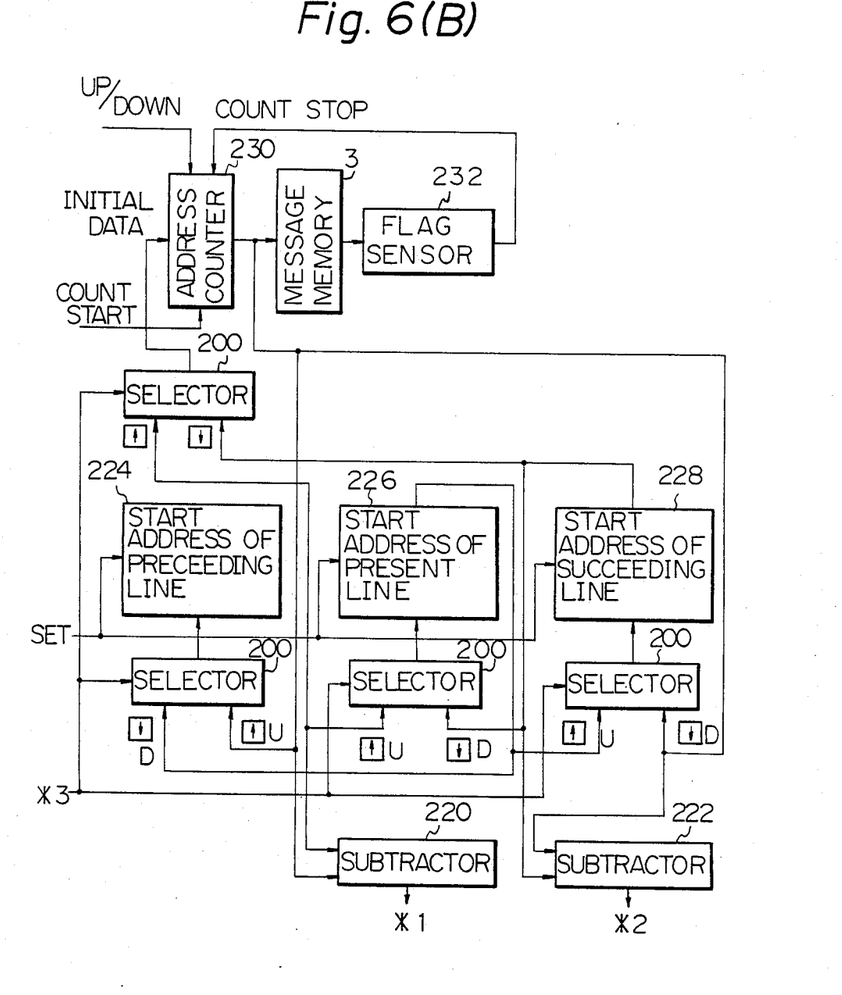

FIG. 2 shows a brief block diagram of the embodiment of the cursor control according to the present invention, in which the reference numerals 1 through 6 show the same members as those in FIG. 1, and the numeral 7 is a cursor processor, and 8 is a cursor memory which provides the cursor location data to said cursor processor 7. FIG. 5 shows the flow diagram of the operation of the cursor processor 7, and FIGS. 6A and 6B show block diagrams of the cursor processor 7.

The cursor memory 8 has four cells each of which stores;

(a) the address (X,Y) of the present cursor location, (b) X-address of the last data location of the preceding (upper) line, (c) X-address of the last data location of the present line, and (d) X-address of the last data location of the succeeding (down) line.

Figure 3A:
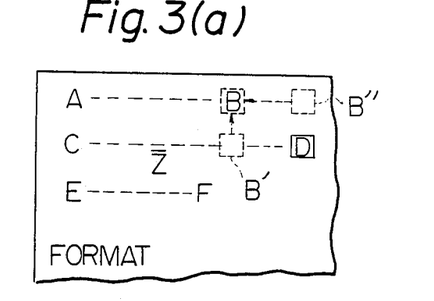

Supposing that the cursor locates at Z in FIG. 3(a), the cell (a) of the cursor memory 8 stores the X-coordinate and the Y-coordinate of the location Z, the cell (b) shows the X-address of the location B, the cell (c) shows the X-address of the location D, and the cell (d) shows the X-address of the location F.

In operation, it is assumed that a message is generated through a conventional manner, and the message is indicated on a screen.

Figure 4:
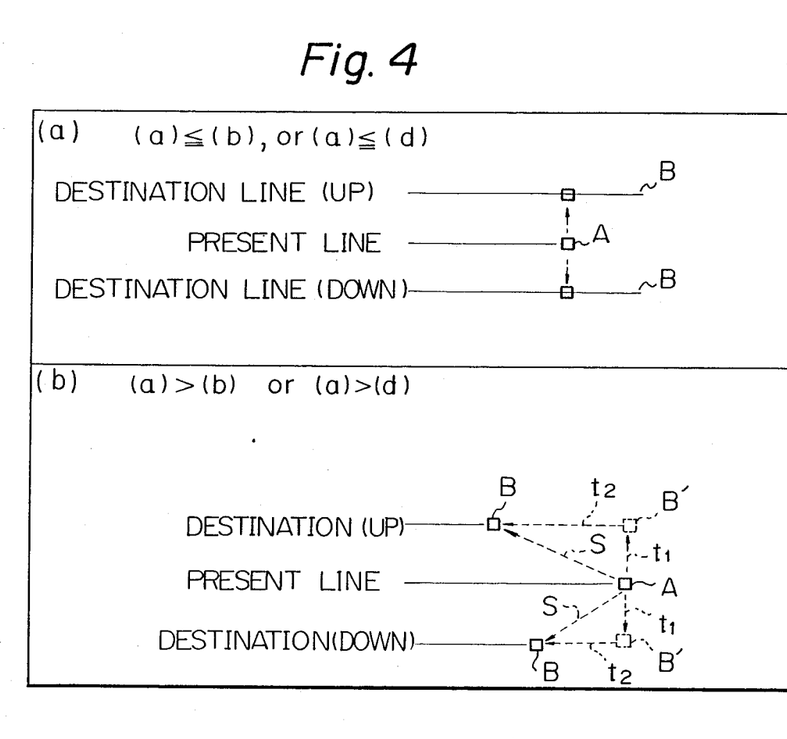

FIG. 4 shows the embodiment of the movement of a cursor, in which (a) shows the case that the X-address of the present cursor location (cell (a)) is equal to or smaller than the X-address of the last data location of the destination line (the preceding line, or the succeeding line), and (b) shows the case that the X-address of the present cursor location (cell (a)) is larger than the X-address of the last data location of the destination line (the preceding (upper) line or the succeeding (down) line).

FIG. 5 shows a flow-diagram of the operation of the cursor processor 7.

In FIG. 5, the box 100 shows merely the start of the operation. The box 102 tests if the up/down key is depressed or not. When the down key which indicates that the cursor goes downwards is depressed, the control goes to the box 114, and when the up key is depressed, the control goes to the box 104.

In the boxes 104, and 114, if the X-address of the present cursor location is equal to or smaller than the X-address of the last data location of the preceding (upper) line (box 104), or the succeeding line (box 114), then, the control goes to the boxes 108, and 118, respectively (see FIG. 4(a)). The operation in those cases is the same as that of a prior art of FIG. 1, and the cursor shifts upwardly or downwardly as shown in FIG. 4(a). Then, the cursor is shifted horizontally to the last data location of the line, as is the case of the conventional manner.

On the other hand, if the X-address of the present cursor location is larger than the X-address of the last data location of the preceding (upper) line (box 104) or the succeeding line (box 114), then, the control goes to the boxes 106, and 116, respectively, and the cursor moves to the last data location of the preceding line or the succeeding line as shown in FIG. 4(b), through the path S. It should be noted that in a conventional manner, the cursor at the location A goes to the location B through the paths $t_1$ and $t_2$. Therefore, the present invention simplifies and reduces the operation of the cursor.

Then, the X-address of the present cursor location in the cell (a) is substituted by the last data location (b) of the preceding line (box 106), or the last data location (d) of the succeeding line (box 116). And, the Y-address of the present cursor location in the cell (a) is incremented (in case of down line), or decremented (in case of upper line).

After the cursor moves, the content of the cursor memory 8 is updated according to the new location of the cursor is shown in the boxes 108, 110, 118, and 120. In the box 108, the cell (d) which has the last data location of the succeeding line is substituted by the last data location of the present line in the cell (c), and the content of the cell (b) which has the last data location of the preceding line enters into the cell (c) which has then the updated last data location of the present line. The content of the cell (b) which has the last data location of the preceding line is revised by referring to the message memory 3 (box 110).

Similarly, in the box 118, the cell (b) which has the last location of the preceding line is substituted by the last data location of the present line in the cell (c), and the content of the cell (d) which has the last data location of the preceding line enters into the cell (c) which has then the updated last data location of the present line. The content of the cell (d) which has the last data location of the succeeding line is revised by referring to the message memory 3 (box 120). The box 130 shows the end of the operation.

FIGS. 6A and 6B show block diagrams of the cursor processor according to the present invention. In the figures, the reference numeral 200 is a selector which selects one of the two input signals U and D according to the output of the cursor key sensor 202. The cursor key sensor 202 provides a signal u when an up key is depressed, or a signal d when a down key is depressed. The numeral 204 is a comparator which has two input signals S and T, and provides and output signal when the input signal S is higher than the input signal T. The numeral 206 is an AND circuit, 208 is a memory cell (a) which stores the present cursor location, and has a row register for storing Y-coordinate of the present cursor location and a column register for storing X-coordinate of the present cursor location. The numeral 210 is the memory cell (c) which stores the X-coordinate of the last data on the present cursor line, 212 is the memory cell (b) which stores the X-coordinate of the last data location on the preceding line, 214 is the memory cell (d) which stores the X-address of the last data location of the succeeding line, 216 is an adder for incrementing an input signal of the same, 218 is a subtractor for decrementing an input signal of the same, 220 and 222 are subtractors, 224 is a register for storing a start address of a preceding line, 226 is a register for storing a start address of the present line, 228 is a register for storing a start address of the succeeding line. The numeral 230 is an address counter for providing address signal to the message memory 3, and 232 is a flag sensor which senses a flag in the output of the message memory 3.

In case of FIG. 4(a) where (a) is equal to or smaller than (b) for upward shift, or (a) is equal to or smaller than (d) for downward shift, the comparator 204 does not provide an output, and the column address register is not updated, but the row address register is incremented or decremented according to the depression of an up key or a down key. Therefore, a cursor shifts merely in upward direction or downward direction. Then, the cells (b), (c) and (d) in the registers 212, 210, and 214, respectively, are updated by the previous content of those registers or the content of the message memory 3.

On the other hand, in case of FIG. 4(b) where (a) is larger than (b) for upward shift, or (a) is larger than (d) for downward shift, the comparator 204 provides an output signal. Then, the AND circuit 206 provides an output signal when either an up key or a down key is depressed, and the output signal of the AND circuit 206 is applied to the column address register which then accepts one of the data locations (b) and (d). Accordingly, the X-address of the cursor on the destination line is updated to the X-address of the last data location of the destination line itself. Simultaneously, the row register in the present cursor location memory 208 is incremented or decremented by the adder 216 or the subtractor 218. Accordingly, both the row register and the column register in the present cursor location memory 208 are updated, and the updated content of the cell (a) shows the location of the last data location of the destination lie. The last data locations (b), (c), and (d) in the registers 212, 210, and 214 are updated also by the previous contents of those registers and the message memory 3.

Figure 3B:
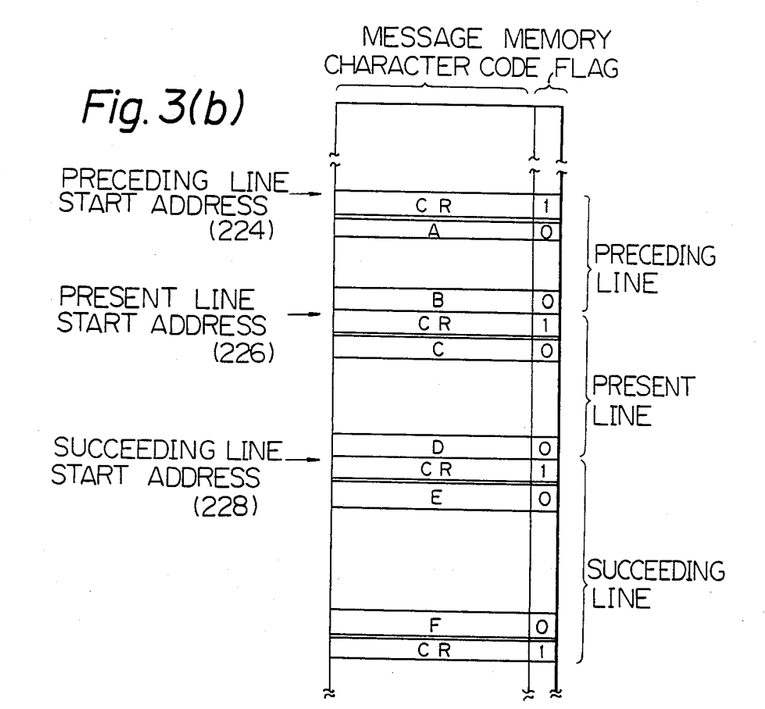

Next, the update of the cells (b) and (d) by the message memory 3 (the boxes 110 and 120 in FIG. 5) is described. That function is shown in the block diagram of FIG. 6B which is coupled with FIG. 6A through the asterisk marks (*1, *2, *3). FIG. 3(b) shows the memory allocation of the message memory 3, in which each screen line has a plurality of characters (A through B, C through D, and E through F), and at the first address of each line a CR code (carriage return) is stored with the flag bit in ON status in order to show the end of the preceding line. The start (first) address of the present cursor line, the preceding (upper) line, and the succeeding (down) line are stored in the registers 226, 224 and 228, respectively (see FIG. 6B).

When the last data location of the upper line is to be searched (box 110 in FIG. 5), the start address of the preceding line in the register 224 is set in the address counter 230 as an initial address, then, the content of the memory 3 designated by the address counter 230 is read out. The address counter 230 is decremented one by one. The flag sensor 232 tests if the content of the memory 3 thus read out according to the address counter 230 has a flag in ON status. When a character with a flag in ON status is read out, the decrement of the address counter 230 stops, and then, the difference between the content of the address counter 230 and the content of the register 224 is calculated by the subcontractor 220, which provides the difference to the cell (b) (see FIG. 4A) which stores the X-address of the last data location in the upper line.

Similarly, when the last data location of the lower line is to be searched (box 120 in FIG. 5), the start address of the succeeding line in the register 228 is set in the address counter 230, then, the content of the same is incremented until the flag is sensed by the flag sensor 232. Upon detection of the flag, the decrement of the address counter 230 stops, and the subtractor 222 provides the difference between the content of the address counter 230 and the content of the register 228. That difference is applied to the cell (d).

As described above, according to the present invention, when a cursor shifts upward or downward, the cursor is automatically located at the last data location of the destination line when the immediate upward location or the immediate downward location is null, merely by depressing an up key or a down key. Therefore, the number of a key operation for locating a cursor is reduced, and the time necessary for edition of a message is shortened. Considering that a cursor is frequently located to a last data location of a line, the present invention is very advantageous.

From the foregoing, it will now be apparent that a new and improved cursor location system has been found. It should be understood of course that the embodiment disclosed is merely illustrative and are not intended to limit the scope of the invention. Reference should be made to the appended claims, therefore, rather than the specification as indicating the scope of the invention.

What is claimed is:

1. A message editor comprising a keyboard having cursor control key functions, a video display screen, a message memory for storing a message comprised of non-null characters, a cursor memory separate from said message memory and processor means for generating and editing a message, said message editor having cursor control means responsive to actuation of said cursor control key functions for controlling a cursor displayed on said screen, said separate cursor memory having four storage registers comprising:
   a first register for storing the present cursor (i) horizontal and (ii) vertical location,
   a second register for storing the horizontal address of the rightmost non-null character of the present cursor horizontal line,
   a third register for storing the horizontal address of the rightmost non-null character of the adjacent cursor horizontal line above the present horizontal cursor location, and
   a fourth register for storing the horizontal address of the rightmost non-null character of the adjacent cursor horizontal line below the present horizontal cursor location,
   said cursor control means including:
   a comparator for comparing (1) the contents of said first register horizontal location to the contents of said third register upon actuation of a cursor control key function indicating upward cursor movement; and (2) the contents of said first register horizontal location to the contents of said fourth register upon actuation of a cursor control key function indicating downward cursor movement;
   a selector for assigning the contents of said third or said fourth register to said first register horizontal location if the value stored in said first register is less than or equal to that stored in said third or said fourth register;
   an adder for incrementing the value stored in said first register vertical location, and
   means for moving said cursor directly to a screen location according to the values stored in said first register.

2. The message editor of claim 1 wherein said comparing means actuates said cursor movement means to move said cursor directly to the location corresponding to the rightmost non-null character location in the requested adjacent vertical line of said message only if the output of said comparing means indicates that the value in said rightmost non-null character location memory means is less than that in said present cursor horizontal memory location.

3. The message editor of claim 1 wherein said comparing means actuates said cursor movement means to move said cursor directly to the adjacent vertical location in the requested adjacent line of said message only if the output of said comparing means indicates that the value in said third or fourth register is not less than that in said first register.

4. The message editor of claim 1 wherein said selector comprises:
   an address counter having inputs representative of vertical director of movement, and initial data values, and having start up and stop count controls,
   a plurality of selectors connected to said first, third and fourth registers for providing a final destination horizontal address for said cursor movement, and a flag sensor for sensing the last location on a line containing message data, said flag sensor connected to said stop count control of said address counter.

5. A message editor comprising a keyboard having cursor control key functions, a video display screen, a message memory for storing a message comprised of one or more lines consisting of characters and an end-of-line indicator, a cursor memory separate from said message memory and processor means for generating and editing a message, said message editor having cursor control means responsive to actuation of said cursor control key functions for controlling a cursor displayed on said screen, said separate cursor memory having four storage registers comprising:

a first register for storing the present cursor (i) horizontal and (ii) vertical location;

a second register for storing the horizontal location of the end-of-line indicator of the present cursor horizontal line, a third register for storing the horizontal location of the end-of-line indicator of the adjacent cursor horizontal line above the present horizontal cursor location, and a fourth register for storing the horizontal location of the end-of-line indicator of the adjacent horizontal line below the present horizontal cursor location;

said cursor control means including:

a comparator for comparing (1) the contents of said first register horizontal location to the contents of said third register upon actuation of a cursor control key function indicating upward cursor movement; and (2) the contents of said first register horizontal location to the contents of said fourth register upon actuation of a cursor control key function indicating downward cursor movement;

a selector for assigning the contents of said third or said fourth register to said first register horizontal location if the value stored in said first register is less than or equal to that stored in said third or said fourth register;

an adder for incrementing the value stored in said first register vertical location (if downward movement has been indicated), and means for moving said cursor directly to a screen location according to the values stored in said first register.

6. The message editor of claim 5 wherein said end-of-line indicator for the current line actuates a flag sensor for starting and stopping the movement of said cursor.

* * * * *